United States Patent
Dykeman (10) Patent No.: US 6,841,974 B2
(45) Date of Patent: Jan. 11, 2005

(54) BATTERY CHARGING METHOD (75) Inventor: Steve W. Dykeman, Alhambra, CA (US)

(73) Assignee: HDM Systems Corporation, Allston, MA (US)

( * ) Notice: Subject to any disclaimer, the term of this patent is extended or adjusted under 35 U.S.C. 154(b) by 145 days.

(21) Appl. No.: 10/099,932

(22) Filed: Mar. 13, 2002

(65) Prior Publication Data

US 2004/0032237 A1 Feb. 19, 2004

Related U.S. Application Data (60) Provisional application No. 60/275,735, filed on Mar. 13, 2001.

(51) Int. Cl.$^7$ .................................................. H02J 7/04
(52) U.S. Cl. .................................................... 320/141
(58) Field of Search ................................. 320/141, 129, 320/140, DIG. 17, DIG. 24, 161, 149; 324/427, 432, 433

(56) References Cited

U.S. PATENT DOCUMENTS

| | | |
|---|---|---|
| 3,597,673 A | 8/1971 | Burkett et al. .............. 320/129 |
| 4,242,627 A | 12/1980 | Kisiel ......................... 320/143 |
| 4,746,852 A | 5/1988 | Martin ....................... 320/106 |
| 4,829,225 A | 5/1989 | Podrazhansky et al. ..... 320/129 |
| 5,307,000 A | 4/1994 | Podrazhansky et al. ..... 320/129 |
| 5,617,005 A | 4/1997 | Brown, Jr. et al. .......... 320/132 |
| 5,838,142 A | 11/1998 | Wyss et al. .................. 320/148 |
| 5,998,970 A | 12/1999 | Ishimaru et al. ............. 320/132 |
| 6,031,359 A | 2/2000 | Michelsen et al. .......... 320/141 |
| 6,043,631 A | 3/2000 | Tsenter ....................... 320/148 |
| 6,094,033 A * | 7/2000 | Ding et al. .................. 320/132 |
| 6,377,028 B1 * | 4/2002 | Armstrong, II et al. .... 320/136 |
| 6,573,687 B2 * | 6/2003 | Kimura et al. |

* cited by examiner

Primary Examiner—Pia Tibbits
(74) Attorney, Agent, or Firm—Knobbe, Martens, Olson & Bear, LLP (57) ABSTRACT

A battery charger that adjusts and applies charging pulses to a battery such that one or more battery parameter is regulated. Terminal voltage of the battery, relative to the battery's quiescent voltage, during the charge application is one such battery parameter indicative of the battery's charge absorption rate. Maintaining the charging voltage at a predetermined value during the charging process is achieved by adjusting the charging pulse both amplitude-wise and temporally. The adjustment of the charging pulse is performed such that a high rate of charge input into the battery is maintained during the charging process.

66 Claims, 8 Drawing Sheets

BATTERY CHARGING METHOD

RELATED APPLICATIONS

This application also claims priority from U.S. provisional application Ser. No. 60/275,735, filed on Mar. 13, 2001.

BACKGROUND OF THE INVENTION

1. Field of the Invention

The invention relates to rechargeable batteries and, in particular, a battery charging system.

2. Description of the Related Art

Batteries are used to power a wide variety of electrical devices. For example, the devices powered by batteries range from a simple flashlight to a complex portable computer. In another example, batteries power devices ranging from a small cellular phone to a relatively large vehicle.

A battery is a power source comprising one or more electrochemical cells, also referred to as voltaic cells. Each voltaic cell comprises two electrodes called a cathode and an anode, with an electrolyte therebetween. Electrochemical reaction between the electrolyte and the electrode causes separation of positive and negative charges, wherein the positive charge accumulate on the anode and the negative charge accumulate on the cathode thereby forming a potential difference. When an external path (circuit) is formed between the electrodes, the potential difference causes the charge to flow (electrical current) in the circuit thereby performing a variety of functions in an electrical device. As the charge is drained from the voltaic cell(s) of the battery, the reaction replenishes the charge up to a point after which the chemical reaction can no longer be sustained. A battery with such "drained" voltaic cell(s) is either replaced or recharged in order to power the electrical device.

Batteries can be grouped into two broad types—a primary type and a secondary type. The primary type comprises disposable batteries, and the secondary type comprises rechargeable batteries. The rechargeable batteries can further be grouped into four types: NiMH (nickel metal hydride), NiCd (nickel cadmium), LiIon (Lithium Ion), and SLA (Sealed Lead Acid) batteries. While the composition of the electrolyte and the electrodes vary among the four types of rechargeable batteries, basic working principle is essentially the same.

In a rechargeable battery, the aforementioned charge-generating electrochemical reaction is reversible in a recharging (or simply referred to as charging) process. The charging process comprises introducing charge from an external source (charger) into the battery such that the charge drives the reverse electrochemical reaction inside the voltaic cell(s). In general, it is desirable to achieve the charging process as quickly as possible. There is a limit, however, on the rate at which the battery can absorb the charge, and such a limit depends on factors such as composition and charge capacity of the battery.

Many conventional battery chargers utilize what is referred to as pulse charging, wherein charge is introduced into the battery in pulses. Pulse charging is known to be an advantageous method of charging in many aspects, including the fact that pulsing of charge followed by a rest period allows the input charge to be absorbed more efficiently. Given such an advantage, traditional pulse chargers further attempts to decrease the charging time by modulating the amplitude of the charge pulses as the charging progresses, based on battery indicators such as voltage. As is known in the art, voltage of the battery being charged is one of the indicators of the state of battery's charge as well as how well the charge is being received by the battery. In particular, a quiescent voltage of the battery (open circuit terminal voltage) is roughly indicative of the charge state of a given battery, and the terminal voltage during a charge pulse relative to the quiescent voltage is indicative of the charge absorption rate. Hence, a traditional pulse charger may modulate the charge pulse amplitude based on the monitored voltages.

Such a pulse charger has drawbacks, including the charger being rather battery specific. The battery specific nature of the conventional pulse chargers arises from the fact that charge pulse amplitude (current amplitude) is modulated based on voltage parameters. As is known in the art, most rechargeable batteries have operating voltages that covers a relatively small range, from several volts to several tens of volts. Thus, a relatively small range of voltage values characterizes a wide variety of batteries whose current rating may differ greatly. Current rating of common rechargeable batteries is known to vary from few milliamps to few amps, a range that covers approximately three orders of magnitude. As an example, a car battery is a 12 volt device that operates with current in the amp range, while a small rechargeable 9 volt battery operates in the milliamp range. Thus attempting to modulate the current amplitude based on these two similar voltage situation is not practical at the least, and may be dangerous in certain situations. Because of such disparity in ranges between voltage and current amplitude, conventional chargers, including pulse chargers, are typically configured to service batteries within a narrower range of current rating.

The conventional pulse charger suffers from an additional drawback even if the charger is configured for a specific group of batteries. The pulse amplitude modulation in response to changes in voltages typically comprises adjusting the amplitude of the pulse. This practice is disadvantageous, for example, in a charging process where the terminal voltage (during pulsing, relative to the quiescent voltage) decreases near the end of the charging process. Such onset of decrease in voltage is indicative of a decrease in charge absorption rate. In response to the voltage decrease, the pulse amplitude is decreased accordingly. In decreasing the pulse amplitude, however, the amount of charge being input per pulse is also decreased. Therefore, a typical conventional pulse charger suffers from reduced charge input as the charge process nears the end.

From the foregoing, there is need for an improved pulse charger that is able to pulse charge a wider range of batteries. There is also a need for an improved charger that is able to maintain a high rate of charge input throughout the charging process.

SUMMARY OF THE INVENTION

The aforementioned needs are satisfied by a battery charging system comprising a power supply that provides cyclic charging pulses to a battery, wherein the charging pulse has a current component and a voltage component that varies between a quiescent voltage and a maximum voltage. The system further comprises a battery monitoring circuit adapted to monitor one or more of battery's parameters that respond to the charging pulses, and a control module that adjusts the configuration of the current component of the charging pulses so as to maintain the voltage component in a range between the quiescent voltage and the maximum voltage in response to the monitored battery parameter.

In one embodiment, the charging pulse is a positive pulse. The current component of the charging pulse comprises a square current pulse having a first amplitude and a first width and wherein the charging cycle has a first period. The first amplitude has a range of approximately 0 to 20 Coulombs/second. The first width has a range of approximately 50 to 1000 milliseconds. The first period has a range of approximately 100 to 2000 milliseconds. The voltage component of the charging pulse depends on the current component and resistance of the battery.

In one aspect of the invention, the battery monitoring circuit monitors the quiescent voltage and the maximum voltage wherein a charging voltage is defined as the difference between the maximum voltage and the quiescent voltage and wherein the charging voltage is indicative of the battery's ability to absorb charge. The control module maintains the charging voltage at a selected voltage level by adjusting the configuration of the current component of the charging pulses. The selected voltage level is approximately 1 volt.

Maintaining the charging voltage at the selected voltage level comprises maintaining the existing configuration of the current component if the monitored charging voltage is approximately equal to the selected voltage level. Maintaining the charging voltage at the selected voltage level comprises increasing the first amplitude of the current pulse by a selected amount if the monitored charging voltage is less than the selected voltage level. The selected amount of current pulse increase is approximately 0.05 Coulomb/second. Maintaining the charging voltage at the selected voltage level comprises decreasing the first amplitude of the current pulse by a selected amount if the monitored charging voltage is greater than the selected voltage level. The selected amount of current pulse decrease is approximately 0.05 Coulomb/second.

The control module further maintains the quiescent voltage at a selected quiescent voltage level by adjusting the configuration of the current component of the charging pulses wherein the quiescent voltage provides some indication of charge state of the battery. In one charging arrangement, the battery is a 12 volt sealed lead acid battery, and the selected quiescent voltage level is approximately 13.5 volts. Maintaining the quiescent voltage at the selected quiescent voltage level comprises maintaining the existing configuration of the current component if the monitored quiescent voltage is approximately equal to the selected quiescent voltage level. Maintaining the quiescent voltage at the selected quiescent voltage level comprises increasing the first width of the current pulse by a selected amount if the monitored quiescent voltage is less than the selected quiescent voltage level. The selected amount of current pulse width increase is approximately 10 milliseconds. Maintaining the quiescent voltage at the selected quiescent voltage level comprises decreasing the first width of the current pulse by a selected amount if the monitored quiescent voltage is greater than the selected quiescent voltage level. The selected amount of current pulse width decrease is approximately 10 milliseconds.

In one embodiment, the current component of the charging pulse comprises a positive square charging current pulse followed by a negative square discharging pulse having a discharging pulse amplitude and a discharging pulse width wherein the discharging pulse aids the battery in charge absorption. The discharging pulse amplitude has a range of approximately 20 to 200 Coulombs/second. The discharging pulse width has a range of approximately 1 to 20 milliseconds. The battery monitoring circuit monitors the quiescent voltage and a voltage immediately following the discharging pulse wherein a post-discharge voltage is defined as the difference between the voltage immediately following the discharging pulse and the quiescent voltage and wherein the post-discharge voltage is indicative of the effectiveness of the discharge process. The control module maintains the post-discharge voltage at a selected post-discharge voltage level by adjusting the configuration of the current component of the charging pulses. The selected post-discharge voltage level is approximately 0.2 volt. The post-discharge voltage at the selected post-discharge voltage level comprises maintaining the existing configuration of the current component if the monitored post-discharge voltage is approximately equal to the selected post-discharge voltage level. Maintaining the post-discharge voltage at the selected post-discharge voltage level comprises decreasing the discharging pulse amplitude by a selected amount if the monitored post-discharge voltage is less than the selected post-discharge voltage level. The selected amount of discharging pulse amplitude decrease is approximately 0.05 Coulomb/second. Maintaining the post-discharge voltage at the selected post-discharge voltage level comprises increasing the discharging pulse amplitude by a selected amount if the monitored post-discharge voltage is greater than the selected post-discharge voltage level. The selected amount of discharging pulse amplitude increase is approximately 0.05 Coulomb/second.

The control module further monitors a duty cycle of the pulse charging cycle to determine state of charge of the battery wherein the duty cycle comprises a ratio of charging pulse width to the charging cycle period. The duty cycle is monitored while maintaining the quiescent voltage at a specified level.

Another aspect of the invention relates to a method of pulse charging a battery. The method comprises applying cycles of charging current pulse to the battery; monitoring voltage of the battery during selected points of each charging cycle wherein the voltage ranges from a quiescent voltage to a maximum voltage; and adjusting the configuration of the current pulse so as to maintain the voltage in a range between the quiescent voltage and the maximum voltage in response to the monitored voltage.

Applying cycles of charging current pulse comprises applying cycles of positive square current pulse having a first amplitude and a first width and wherein the charging cycle has a first period. The first amplitude has a range of approximately 0 to 20 Coulombs/second. The first width has a range of approximately 50 to 1000 milliseconds. The first period has a range of approximately 100 to 2000 milliseconds.

Monitoring voltage of the battery comprises monitoring the quiescent voltage and the maximum voltage wherein a charging voltage is defined as the difference between the maximum voltage and the quiescent voltage. Maintaining the voltage comprises maintaining the charging voltage at a selected voltage level. The selected voltage level is approximately 1 volt. Maintaining the voltage comprises maintaining the quiescent voltage at a selected quiescent voltage level. The selected quiescent voltage level is approximately 13.5 volts for a 12 volt battery.

Adjusting the configuration of the current pulse comprises increasing the first amplitude of the current pulse if the monitored charging voltage is less than the selected voltage level. The first amplitude is increased by approximately 0.05 Coulomb/second. Adjusting the configuration of the current pulse comprises decreasing the first amplitude of the current pulse if the monitored charging voltage is greater than the selected voltage level. The first amplitude is decreased by approximately 0.05 Coulomb/second. Adjusting the configuration of the current pulse comprises increasing the first width of the current pulse if the monitored quiescent voltage is less than the selected quiescent voltage level. The first width is increased by approximately 10 milliseconds. Adjusting the configuration of the current pulse comprises decreasing the first width of the current pulse if the monitored quiescent voltage is greater than the selected quiescent voltage level. The first width is decreased by approximately 10 milliseconds.

Applying cycles of charging current pulse comprises applying cycles of a positive square charging pulse followed by a negative square discharging pulse wherein the discharging pulse has a discharging pulse amplitude and a discharging pulse width. The discharging pulse amplitude has a range of approximately 20 to 200 Coulombs/second. The discharging pulse width has a range of approximately 1 to 20 milliseconds.

Monitoring voltage of the battery comprises monitoring the quiescent voltage and a voltage immediately following the discharging pulse wherein a post-discharge voltage is defined as the difference between the voltage immediately following the discharging pulse and the quiescent voltage. Maintaining the voltage comprises maintaining the post-discharge voltage at a selected post-discharge voltage level. The selected post-discharge voltage level is approximately 0.2 volt. Adjusting the configuration of the current pulse comprises decreasing the discharging pulse amplitude if the monitored post-discharge voltage is less than the selected post-discharge voltage level. The discharging pulse amplitude is decreased by approximately 0.05 Coulomb/second. Adjusting the configuration of the current pulse comprises increasing the discharging pulse amplitude if the monitored post-discharge voltage is greater than the selected post-discharge voltage level. The discharging pulse amplitude is increased by approximately 0.05 Coulomb/second.

Adjusting the configuration of the current pulse results in change in duty cycle of the charging pulse wherein the duty cycle comprises a ratio between the width of the charging pulse to the period of the cycle. The duty cycle is monitored wherein the duty cycle is a good indicator of state of charge for a wide variety of batteries and wherein the duty cycle is generally independent of the type of battery.

DETAILED DESCRIPTION OF THE PREFERRED EMBODIMENT

Reference will now be made to the drawings wherein like numerals refer to like parts throughout. The description of methods and their corresponding embodiments of the invention described herein is in context of charging an arbitrary rechargeable battery. In describing the inventive features of the charging process, exemplary values relating to battery parameters are disclosed in context of a standard 12 volt battery. It will be understood, however, that general inventive concepts disclosed herein are equally applicable to any number of rechargeable batteries used in any number of applications (e.g., cellular phone battery charging, standard-sized battery charging, etc.) without departing from the spirit of the invention.

The invention described herein relates to a battery charger that monitors one or more parameters of the battery, and based on the monitored parameters, regulates the charging and or discharging pulses. In particular, the monitored battery parameters include the terminal voltages of the battery that are indicative of the charge state, as well as the charge absorption rate of the battery. In one aspect of the invention, the charger maintains one or more of the terminal voltages at selected values by adjusting the charging and/or discharging pulses in manners described below. Basing the charging process on regulated voltages permit the charger to service a wide range of rechargeable batteries in terms of battery types and sizes. This advantageous feature is based on the fact that voltage ranges of most rechargeable batteries generally fall somewhere between few volts to few tens of volts—a relatively small range when compared to other battery parameters such as amperage. The battery charger described herein is able to tailor the charging process based on a relatively common parameter among a wide variety of batteries. Thus, such an improved battery charger is able to charge a wide variety of batteries.

Figure 1:
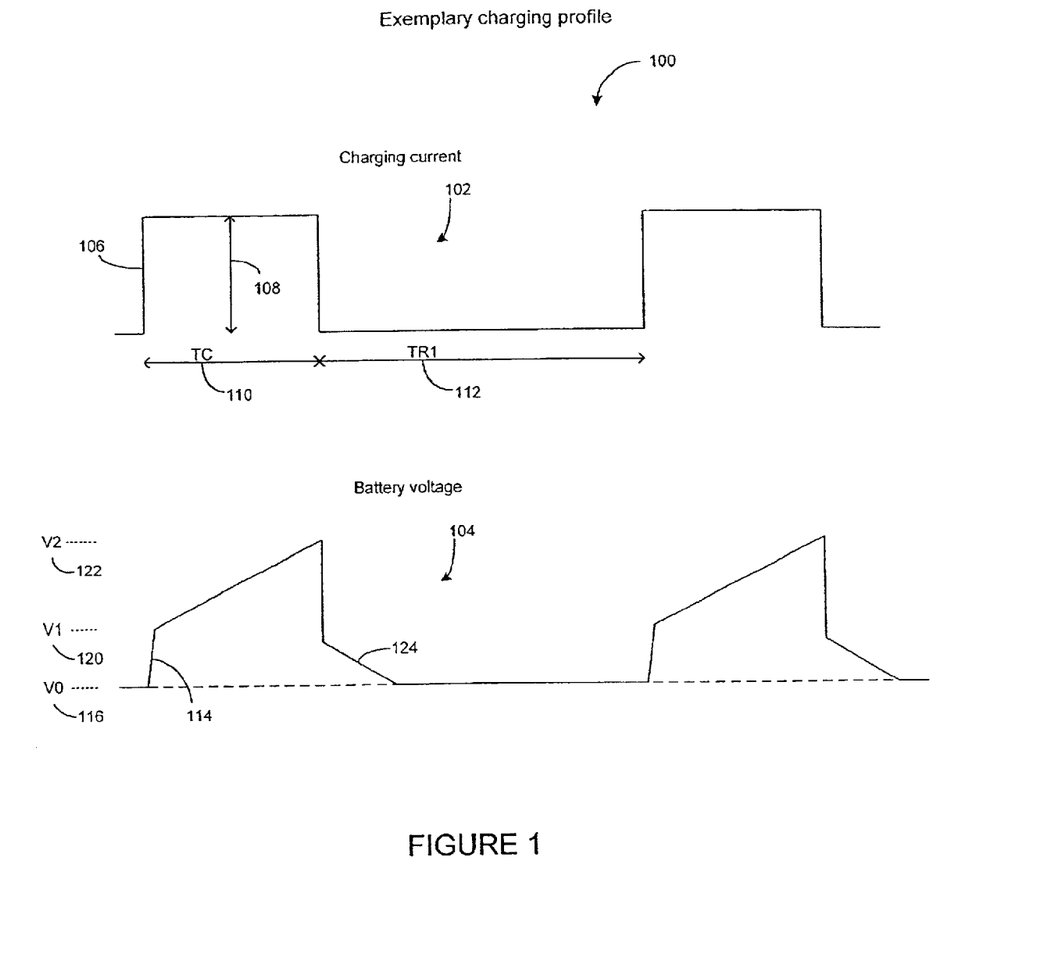
FIG. 1 illustrates one possible waveform of a pulse charger.
Figure 2:
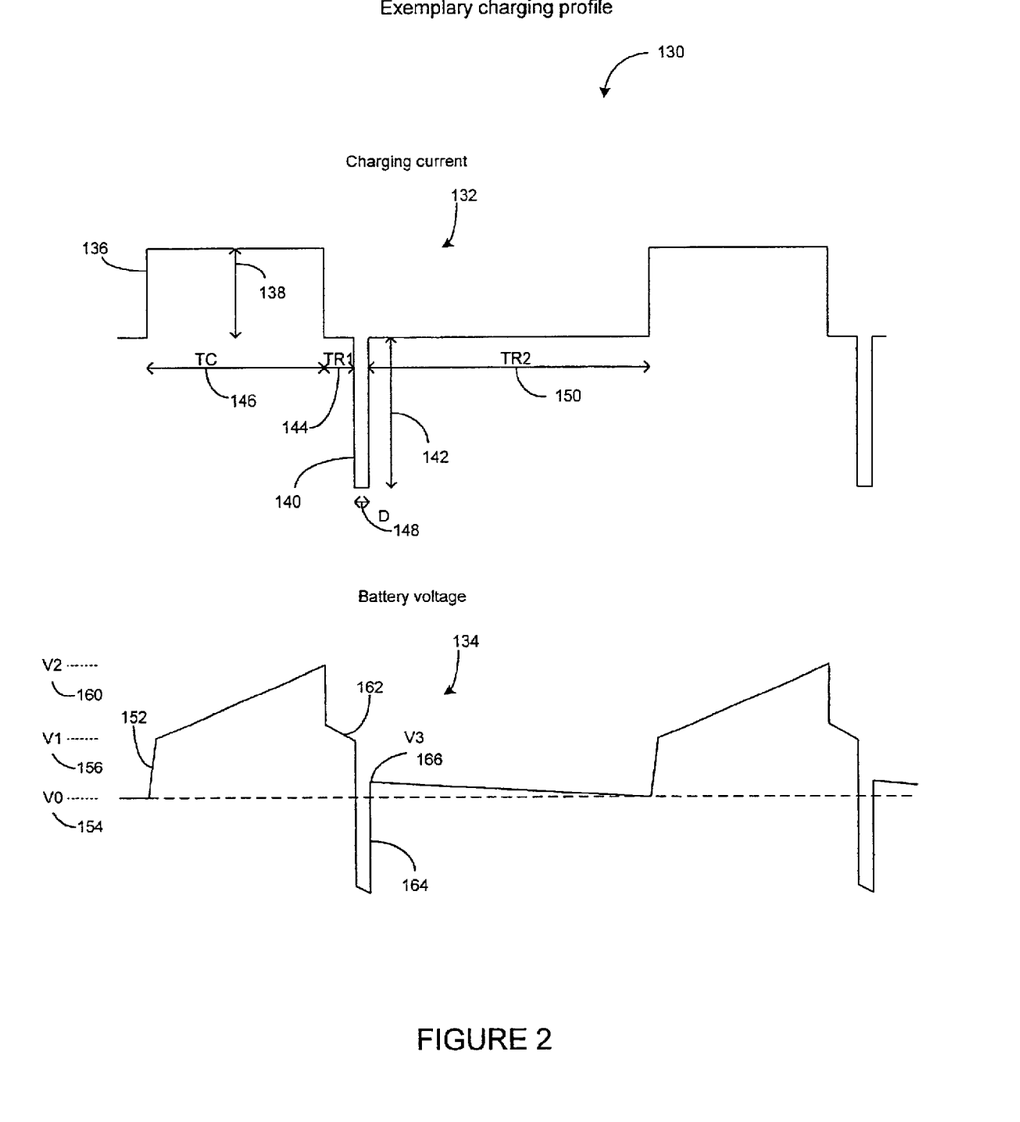
FIG. 2 illustrates another possible waveform of a pulse charger wherein the waveform includes a discharge pulse.

The detailed description of the battery charger is organized hereinbelow such that FIGS. 1 and 2 illustrate two possible known implementations of pulse charging that may be utilized in conjunction with the inventive concept of regulating one or more battery parameters such as the battery voltage. FIGS. 3–8 then illustrate various embodiments and implementations of the invention.

FIG. 1 illustrates an exemplary charging profile 100 that results from using one embodiment of the invention. The charging profile comprises a charge current profile 102 and a battery voltage profile 104 that results from application of the charge current profile 102 to a battery. The charge current profile 102 is applied to the battery by a charger that is described below, and comprises a pulse 106 that is applied periodically. In one implementation of the charge current profile 102, the pulse 106 is a square pulse with an amplitude 108 and width TC 110. The pulse 106 repeats after a rest period TR1 112; thus, the pulse repetition cycle has a period T of TC+TR1. Values of these pulse parameters are variable within their respective ranges, and the pulse parameters are advantageously adjusted to achieve improved battery charging in a manner described below.

In one embodiment, the charge current pulse amplitude 108 has a range of approximately 0 to 20 Coulombs/sec. The pulse width TC 110 has a range of approximately 50 to 1000 ms. The rest period TR1 112 has a range of approximately 50 to 1000 ms; thus, the period T has a range of approximately 100 to 2000 ms. These ranges of pulse related parameters is essence define a relatively wide range of batteries that can be charged in a safe and effective manner.

In response to the application of the charge current profile 102, the battery's terminal voltage is characterized by the voltage profile 104. A voltage V0 116 represents a quiescent (open circuit) voltage between the battery terminals. When the charge pulse 106 is applied, the battery voltage also increases sharply to V1 120 due to a sharp increase in the charge influx. As the charge pulse applies a substantially constant current to the battery during the period TC 110, the charge content in the battery increases substantially linearly. As a result, the battery voltage increases substantially linearly to V2 122. When the pulse of charge current is turned off sharply after the period TC 110, the battery voltage also decreases sharply in response to a level above the rest voltage V0. As is understood in the art, such an elevated voltage is a result of the unabsorbed charge lingering inside the battery. As the unabsorbed charge drains back out to the charger, the battery voltage undergoes a relaxation transition 124 to a level that is close to the voltage V0. It will be appreciated that the response of the battery (in terms of voltage) in response to the applied current, such as that just described, is known in the art. It is also known in the art that the voltages V0, V1, V2, and combinations thereof, are some of the indicators of the state of charge of the battery, as well as charge absorption rate of the battery. Hence, one aspect of the invention relates to advantageously adjusting the charge pulse parameters based on these indicators so as to improve the manner in which batteries are charged.

FIG. 2 illustrates another exemplary charging profile 130 wherein a charge current profile 132 is applied to the battery that responds with a voltage profile 134. The periodic repetition of square pulses 136 is similar to that described above in reference to FIG. 1, wherein the pulse 136 has an amplitude 138 and a width TC 146. In addition to the square charge pulse 136, a single cycle of the charge current profile 132 further comprises a discharge pulse 140 that follows the charge pulse 136 after a first rest period TR1 144. The discharge pulse 140 has an amplitude 142 and a width D 148 and is followed by a second rest period TR2 150 that completes the cycle. Thus, the charge/discharge repetition cycle has a period T of TC+TR1+D+TR2. Values of these pulse parameters are variable within their respective ranges, and the pulse parameters are advantageously adjusted to achieve improved battery charging in a manner described below.

In one embodiment, the charge current pulse amplitude 138 has a range of approximately 0 to 20 Coulombs/sec. The pulse width TC 146 has a range of approximately 50 to 1000 ms. The first rest period TR1 144 has a range of approximately 1 to 20 ms. The discharge pulse amplitude 142 has a range of approximately 20 to 200 Coulombs/sec, and the discharge pulse width D 148 has a range of approximately 1 to 20 ms. The second rest period TR2 150 has a range of approximately 50 to 1000 ms. The period between pulse set is the sum of the aforementioned time intervals. These ranges of pulse related parameters is essence define a relatively wide range of batteries that can be charged in a safe and effective manner.

The application of the discharge pulse is known to "shake up" unabsorbed ions that build up near the plate surface inside the battery. By shaking up these unabsorbed ions and pulling them away from the plates (via reverse bias), subsequent charge pulse cycle is better able to deposit ions into the plate. The discharge pulse may be achieved by the charger during a non-charging portion of the cycle by providing a temporary load circuit through which the battery can discharge.

FIG. 2 further illustrates the battery voltage profile 134 in response to the charge current profile. The voltage response to the square pulse 136 is similar to that described above in reference to FIG. 1. In particular, voltages V0 154, V1 156, and V2 160 define the terminal voltages at various transition points of the charging cycle. Additionally, a relaxation transition 162 is similar to its FIG. 1 counterpart 124 aside from being truncated by a reverse bias voltage dip 164 caused by the discharge pulse 140. At the end of the discharge pulse 140, the battery voltage becomes V3 166 that is different than the quiescent voltage V0 154. The voltage V3 166 relative to V0 154 is a reflection of the extent discharging of the excess charge of the unabsorbed ions from the battery. As seen in FIG. 2, the battery voltage V3 166 relaxes to V0 as the excess charge is drained out into the charger during the non-charging portion of the cycle. The aforementioned response of the battery (in terms of voltage) in response to the applied current is also known in the art. Again, it is also known in the art that the voltages V0, V1, V2, V3 and combinations thereof, are some of the indicators of the state of charge of the battery, as well as charge absorption rate of the battery. Hence, the invention also relates to advantageously adjusting the charge and discharge pulse parameters based on these indicators so as to improve the manner in which batteries are charged.

Figure 3A:
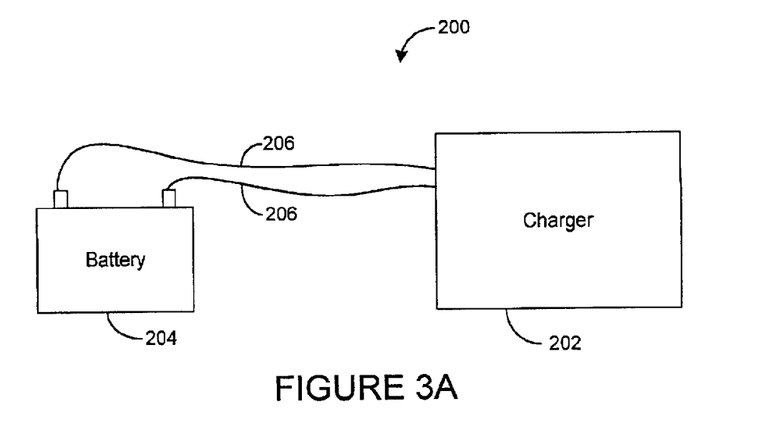
FIG. 3A illustrates an exemplary battery charging setup comprising a battery charger coupled to a battery.
Figure 3B:
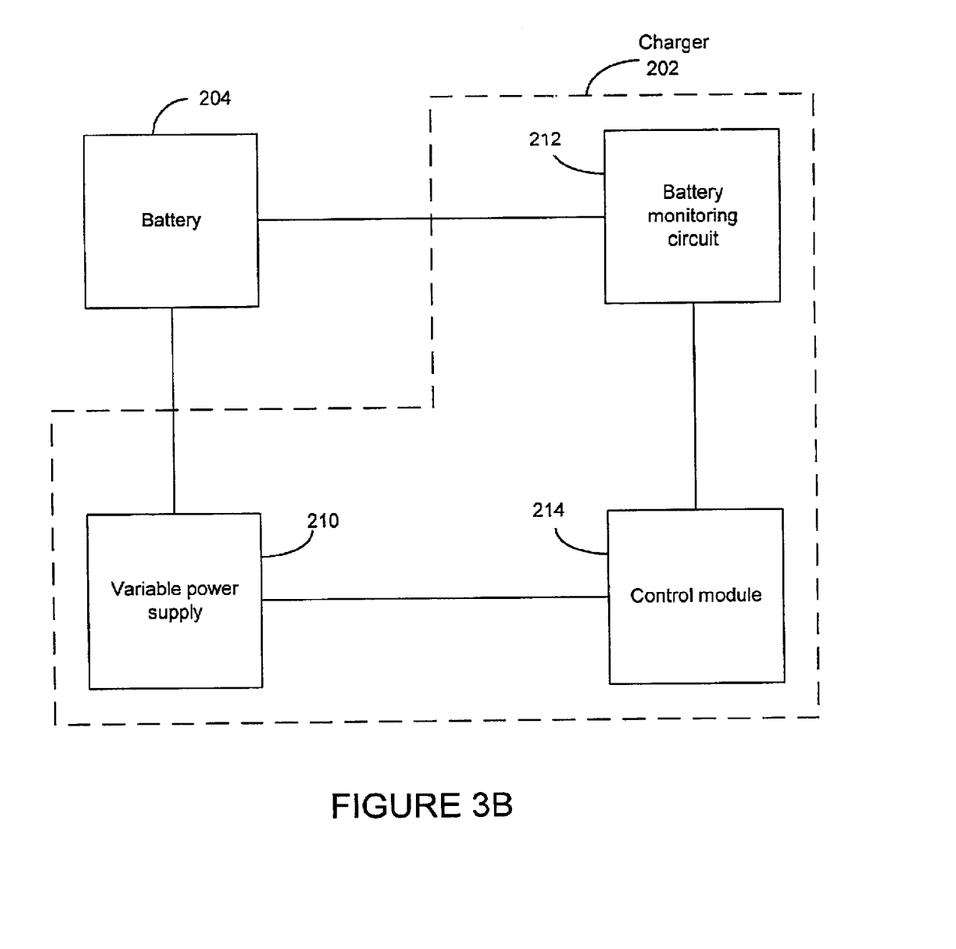
FIG. 3B illustrates one embodiment of the battery charger of FIG. 3A wherein the battery charger is configured to implement the inventive concept.

FIGS. 3A and B illustrate how a battery may be charged using a charger embodying inventive processes that are described below and whose waveforms are described above. FIG. 3A is a simple diagram that shows a charging setup 200 wherein a battery 204 is coupled to a charger 202 by coupler 206. In one embodiment, two terminals of the battery 204 are connected via the coupler 206 comprising a pair of cables. In another embodiment, the battery 204 may be coupled to the charger 204 by the coupler 206 wherein the coupling is via induction. A power input to the charger 202 and any load that might be connected to the battery 204 are not shown for simplicity.

When the battery 204 is coupled to the charger 202 in such a way, the charger 202 forms a functional relationship with the battery 204 in a manner illustrated in FIG. 3B. The charger 202 comprises functional blocks including a variable power supply 210, a battery monitoring circuit 212, and a control module 214. The power supply 210 is coupled to the battery by the coupler 206 (FIG. 3A). The battery monitoring circuit 212 is also coupled to the battery 204. In the charging setup illustrated in FIG. 3A, the battery monitoring circuit 212 may reside inside the charger 202 and tap off of the two cables that connect to the battery terminals. Both of the power supply 210 and the battery monitoring circuit 212 are functionally coupled to the control module 214. In one embodiment of the charger, the control module 214 resides inside or on the charger 202. The control module 214, however, may reside remotely from the charger itself (communicating by wireless digital signal, for example) without departing from the spirit of the invention.

The charger 202 described above in reference to FIGS. 3A–B are configured to perform one or more inventive charging processes described below in reference to FIGS. 4–6. In particular, the control module 214 in response to battery parameter(s) measured by the monitoring circuit 212 and effected by the power supply 210, performs the various charging processes described below. The process regulates various voltages of the battery during the charging cycle by adjusting the charging pulses. As previously described, regulating the voltage during the charging process permits the charger to adapt to a wide variety of rechargeable batteries.

Figure 4:
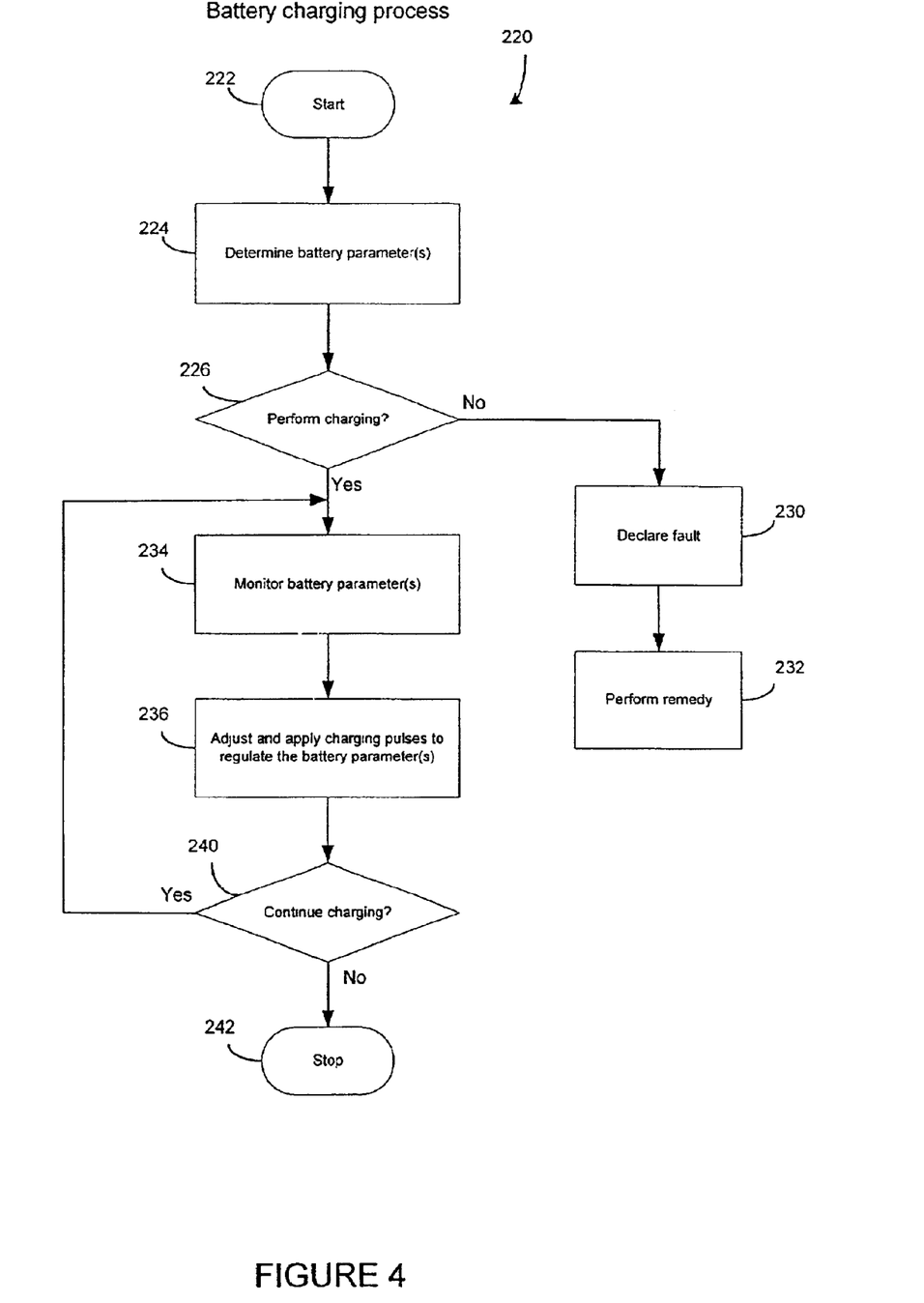
FIG. 4 illustrates an implementation of the inventive charging process.
Figure 5:
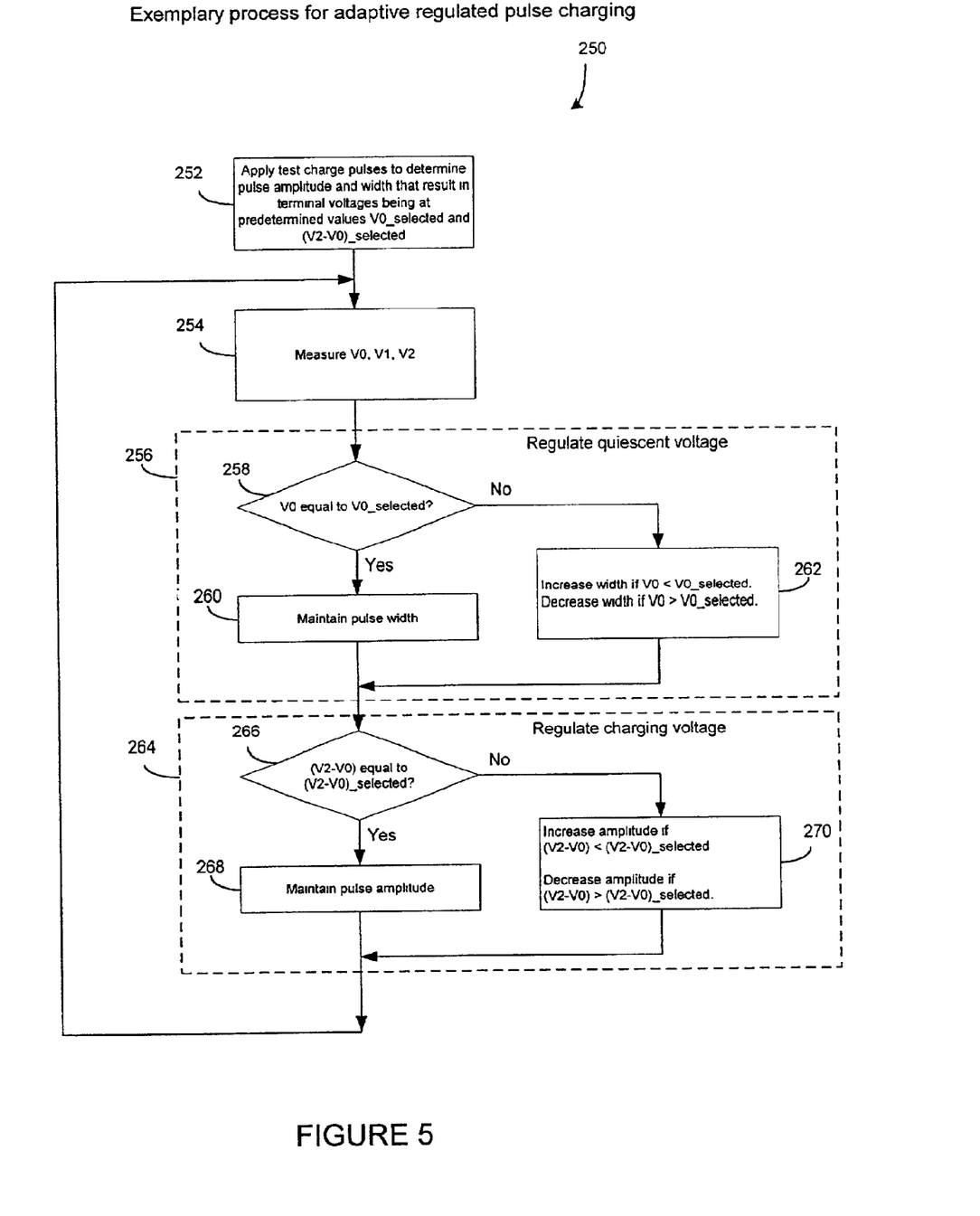
FIG. 5 illustrates one aspect of the inventive regulating process that occurs during the charging process.
Figure 6:
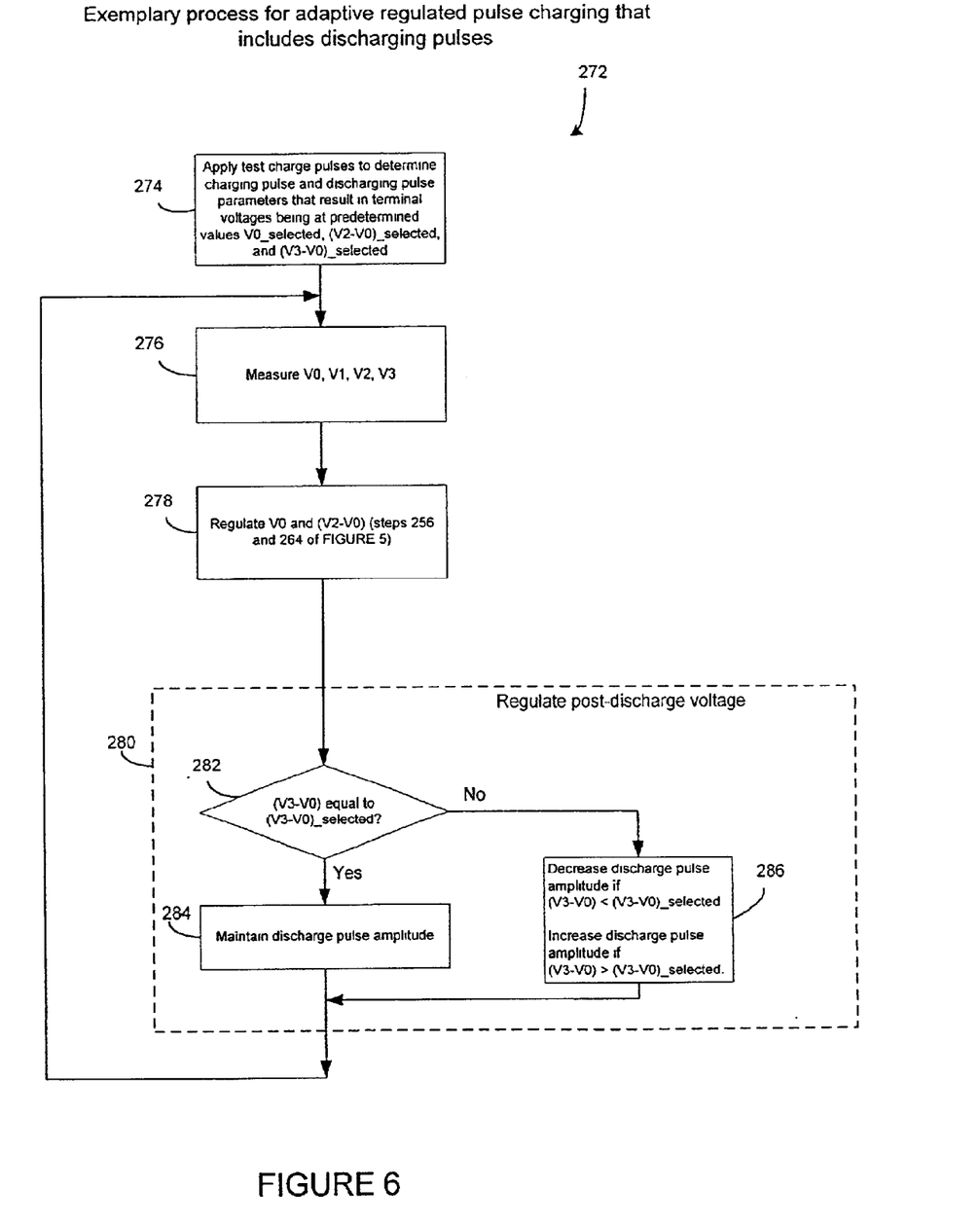
FIG. 6 illustrates another aspect of the inventive regulating process that occurs during the charging process.

FIGS. 4–6 now describe inventive aspects of battery charging process that may be achieved using the aforementioned charger that charges the battery using the pulse cycles described above in reference to FIGS. 1–2. FIG. 4 illustrates a high level description of a battery charging process 220. The process 220 starts at state 222, and in state 224 that follows, the charger determines one or more battery parameters. Specific examples of these parameters are described below in greater detail. Based on the values of the battery parameters, the charger determines whether charging should be performed in a decision state 226. If the answer is "no", a fault is declared in state 230, after which any number of remedial actions can be taken in state 232. Some examples of remedial actions for batteries unsuitable for charging include performing a cold cranking amp (CCA) test, and performing a burn-in, both processes whose general principles are known in the art.

If the answer in the decision state 226 is "yes", the process enters and remains in a loop until the process determines that charging should not continue. The charger monitors the battery parameters in state 234, and in state 236 that follows, the charger adjusts and applies charging pulses to regulate the battery parameters. The charger then determines whether to continue charging in a decision state 240. If the answer is "yes" then the process loops back to state 234 for further monitoring and charging. If the answer is "no" then the charger stops charging in state 242. The charger may stop the charging process, for example, when the process determines that the battery is charged to a predetermined "full" level. The cessation of charging may comprise a complete stoppage of monitoring and current application, or having the charger go into a charge maintenance mode so as to keep the battery's charge "topped off" until the battery is removed from the charger, wherein both of these cessation modes are generally known in the art.

FIG. 5 now illustrates an exemplary process 250 for adaptive regulated pulse charging performed by the charger 202 of FIG. 3 utilizing the charging profile (square pulses) of FIG. 1. The process 250 represents states 234 and 236 of the generalized charging process described above in reference to FIG. 4, and utilizes voltages V0 and V2 as the indicators of the charge state and absorption rate of the battery. As is generally understood in the art, the quiescent voltage V0 is a rough indicator of the charge state of the battery, and the maximum voltage V2 during the application of input charge to the battery (relative to V0), V2-V0, is indicative of the charge absorption rate. In one aspect of the invention, these battery voltages are regulated to remain at substantially constant values or within specified ranges by adjusting the charging pulse parameters in a manner described below. Specifically, V0 can be effectively regulated by adjusting the width of the pulse, especially near the end of the charging process. Also, V2-V0 (referred to as charging voltage) can be effectively regulated by adjusting the amplitude of the charging pulse.

In the charging process 250, in state 252, the charger applies test pulses to the battery to determine pulse amplitude and width that result in terminal voltages being at predetermined values V0_selected and (V2-V0)_selected. The pulse may be adjusted by changing the amplitude, width, period between pulses, or some combination thereof. In state 254 that follows, the battery monitoring circuit measures V0, V1, and V2, and based on the measurement, performs regulation of the quiescent voltage V0 in step 256 and regulation of charging voltage V2-V0 in step 264. The process then continues in a loop that goes back to the monitoring state 254 that now measures the voltages in response to the adjustments performed in the regulation steps 256 and 264. The looping process continues until charging stops.

The quiescent voltage V0 regulating step 256 that follows the monitoring state 254 comprises a decision state 258 that determines if V0 is substantially equal to V0_selected. If the answer is "yes", the existing charging pulse width is maintained in state 260 after which the process continues on to perform the charging voltage regulation step 264. If the answer is "no", the width of the pulse is adjusted in state 262, after which the process continues on to perform the charging voltage regulation step 264. In state 262, the pulse width is adjusted such that if V0 is less than V0_selected (indicating initial or early portion of charging), the width is increased by a selected amount so as to increase the amount of charge being injected into the battery during each cycle. Conversely if V0 is greater than V0_selected (indicating that the charging process is near completion), the width is decreased by a selected amount. In one implementation of the charging process, the predetermined quiescent voltage value V0_selected is set at approximately 13.5 volts when the charger is connected to a 12 volt battery. The pulse width is adjusted in increments (or decrements) of approximately 10 ms.

The charging voltage V2-V0 regulating step 264 that follows step 256 comprises a decision state 266 that determines if V2-V0 is substantially equal to (V2-V0)_selected. If the answer is "yes", the existing charging pulse amplitude is maintained in state 268 after which the process continues on loop back to state 254. If the answer is "no", the amplitude of the pulse is adjusted in state 270, after which the process continues on to loop back to state 254. In state 270, the pulse amplitude is adjusted such that if V2-V0 is less than (V2-V0)_selected (indicating that the charging process is near completion), the amplitude is increased by a selected amount. Conversely if V2-V0 is greater than (V2-V0)_selected (indicating initial or early portion of charging), the amplitude is decreased by a selected amount. In one implementation of the charging process, the predetermined charging voltage value (V2-V0)_selected is set and regulated at approximately 1.0 volt. The pulse amplitude is adjusted in increments (or decrements) of approximately 0.05 Coulomb/sec.

By adjusting the width of the charging pulse, a duty cycle of the charging process changes. As is understood in the art, the duty cycle refers to a ratio of time spent performing a duty to the period of the cycle. Thus, duty cycle in the pulse charging process comprises a ratio of the charging pulse width to the period. The duty cycle of the pulse charger is an accurate indication of the battery's charging state. As the battery fills up with charge, the duty cycle generally decreases. Furthermore, duty cycle is generally independent of the type of battery. Thus in one aspect of the invention, duty cycle is monitored while regulating the quiescent voltage V0 so as to determine the state of charge of a wide range of batteries.

As described above in reference to FIG. 5, the charging pulse is preferably adjusted during the latter portion of the charging process such that the pulse width decreases and the amplitude increases. As is understood in the art, application of short charging pulses during the latter portion of the charging process is a more efficient method of introducing charge into the battery. The charging process of the invention, by increasing the pulse amplitude while shortening the pulse duration, advantageously achieves such an efficient charging while maintaining a high charge content of the pulse afforded by the high amplitude. Furthermore, maintaining such a high charge input is afforded by regulating the battery voltages. Regulating a voltage in essence automatically adjusts the current in response to changing condition of the battery. In particular, internal resistance of the battery changes as the battery is being charged. If a traditional charger modulates its current being introduced into the battery, implementation of shortening the pulse duration and increasing the pulse amplitude simultaneously is substantially difficult, and as a result, the charging pulses near the end of the charging process may not achieve high charge input into the battery.

FIG. 6 now illustrates a charging process 272 that can be implemented utilizing the charge/discharge cycle described above in reference to FIG. 2. The inventive concept of regulating the battery's voltages during pulse charging is applied to the discharging pulse. One advantageous result is an optimized discharging during each cycle such that "just enough" excess charge is removed from the battery so as to improve subsequent absorption of ions into the plates. As is understood in the art, excessive discharging is not desired since some of the drained charge needs to replaced during the following charging cycle. One indication of excessive discharging is manifested in voltage V3 (FIG. 2) being less than V0. As is also understood in the art, insufficient discharging is also not desired since the excess charge of the ions blocking the plates reduces subsequent ion absorption. One indication of insufficient discharging is manifested in voltage V3 being greater than V0 by a selected amount. Thus, by regulating the voltage combination V3-V0 at a value substantially equal to or within a specified range, the discharging pulse can be utilized efficiently. In one implementation, the regulation of V3-V0 is performed by adjusting the amplitude of the discharge pulse. It will be appreciated that other parameters of the discharge pulse, such as the duration of the pulse, may be implemented in V3-V0 regulation in a similar manner without departing from the spirit of the invention.

The charging process 272 begins in state 274, wherein the charger applies test charge pulses to determine charging pulse and discharging pulse parameters that result in terminal voltages being at predetermined values V0_selected, (V2-V0)_selected, and (V3-V0)_selected. In state 276 that follows, the battery monitoring circuit measures voltages V0, V1, V2, and V3. The process then, in step 276, performs regulations of V0 and (V2-V0) in a manner similar to steps 256 and 264 described above in reference to FIG. 5.

The charging process then performs regulation of post-discharge voltage V3-V0 in step 280 that comprises a decision state 282 that determines whether V3-V0 is equal to (V3-V0)_selected. If the answer is "yes", the existing amplitude for discharge pulse is maintained in state 284 after which the process loops back to state 276. If the answer is "no", the amplitude of discharging pulse is adjusted in state 286 after which the process loops back to state 276. In state 276, the discharge pulse amplitude is decreased if V3-V0 is less than (V3-V0)_selected as a result of excessive discharging. The discharge pulse amplitude is increased if V3-V0 is greater than (V3-V0)_selected as a result of insufficient discharging. In one implementation of the charging process, the predetermined post-discharge voltage (V3-V0)_selected is set at approximately 0.2 volt. The discharge pulse amplitude is adjusted in increments (or decrements) of approximately 0.05 Coulomb/sec.

Figure 7:
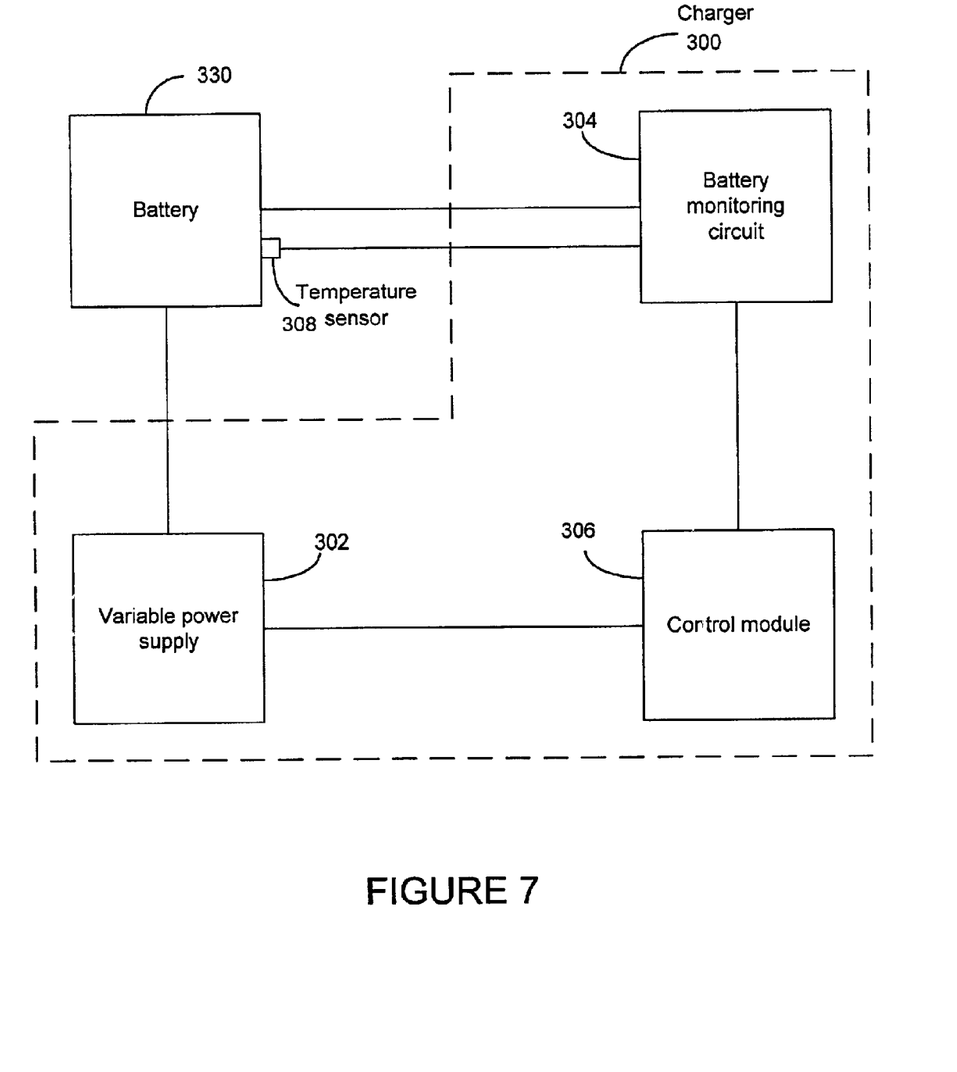
FIG. 7 illustrates another embodiment of the battery charger that includes a temperature sensor for measuring the battery's temperature.
Figure 8:
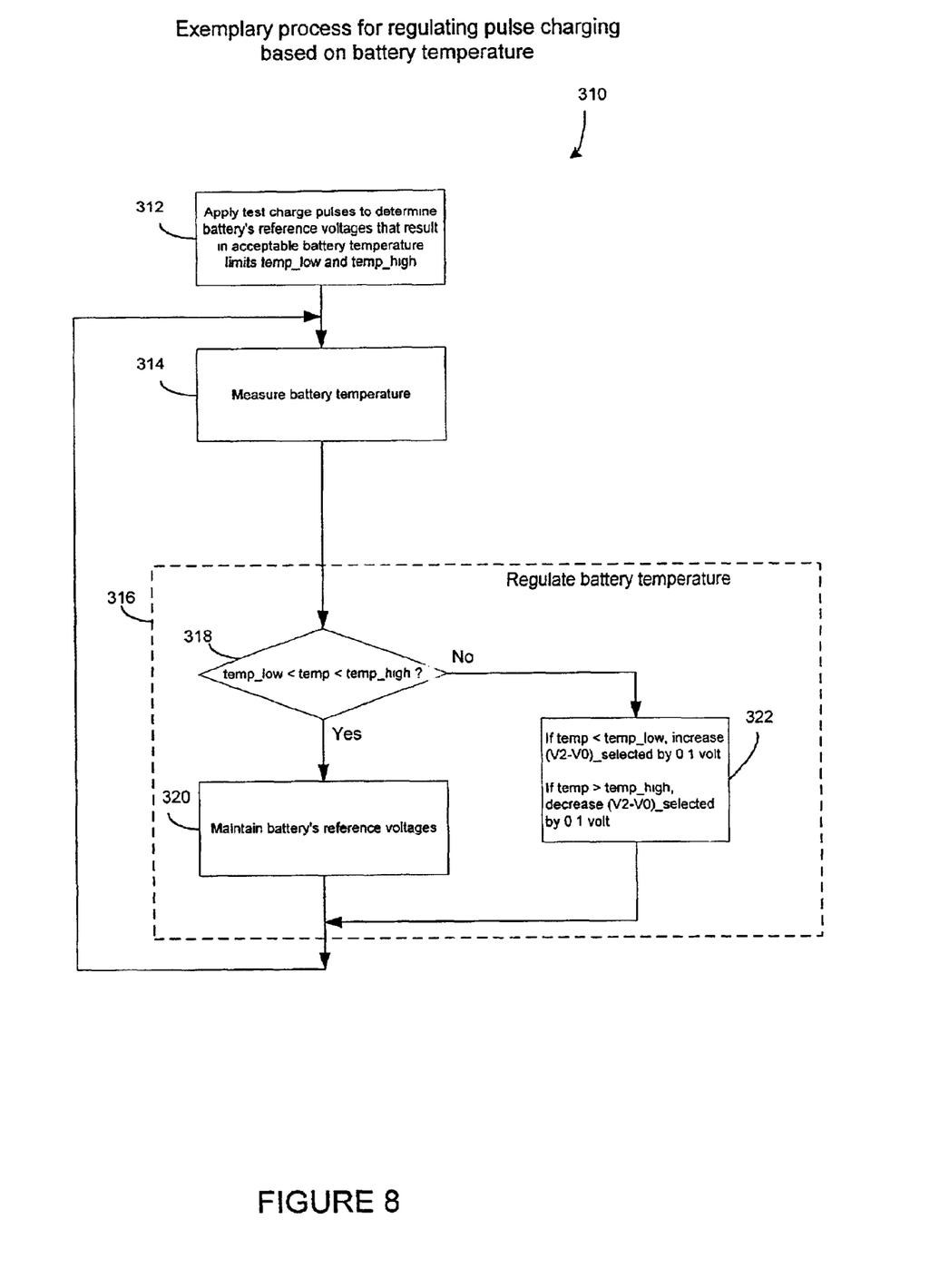
FIG. 8 illustrates an exemplary implementation of regulating the battery's voltage during the charging process.

FIGS. 7 and 8 illustrate another aspect of the invention, wherein a non-voltage parameter of the battery is regulated in a similar manner. In certain applications, it may be more desirable to control the temperature of the battery rather than the voltage—as an example, a rechargeable battery installed in a temperature sensitive instrument or environment. Regulation of the temperature of the battery is achieved by applying the inventive concepts to temperature instead of voltages.

In particular, FIG. 7 illustrates a temperature sensing charger 300 coupled to a battery 330. The charge 300 comprises a variable power supply 302, a battery monitoring circuit 304, and a control module 306 that are intercoupled to each other and coupled to the battery in a manner similar to that described above in reference to FIG. 3B. The charger 300 further comprises a temperature sensor 308 that measures a temperature associated with the battery 330. As is understood in the art, temperature can vary significantly throughout the battery. As an example, temperature of the core of the battery is typically different than the temperature of the case. For the purpose of describing the temperature regulation process, it will be assumed that the temperature sensor measures the case temperature of the battery. It will be appreciated, however, that other battery temperatures including the core temperature may be measured and utilized without departing from the spirit of the invention. It will also be assumed that the battery monitoring circuit 304 is adapted to measure the temperature signal from the temperature sensor 308.

FIG. 8 now illustrates a charging process 310 that regulates the battery temperature by adjusting the charging (and/or discharging) pulse. The process 310 begins in state 312 wherein the charger applies test charge pulses to determine battery's reference voltages that result in acceptable battery temperature limits temp_low and temp_high. The battery's reference voltages may include, but is not limited to, V0_selected, (V2-V0)_selected, and/or (V3-V0)_selected referred to above in reference to FIGS. 4–6. In state 314 that follows, the battery monitoring circuit measures battery's temperature. The charger then regulates battery's temperature in step 316 that comprises a decision state 318 that determines if the measured temperature is within the limits temp_low and temp_high. If the answer is "yes", existing reference voltages for the battery are maintained in state 320 after which the process loops back to state 314. If the answer is "no", the measured temperature is outside of the acceptable range. Thus, in state 322 the battery's reference voltages are adjusted, after which the process loops back to state 314. In one implementation, if the measured temperature is lower than temp_low (indicating that the battery can be charged at a greater rate), the charging voltage reference (V2-V0)_selected is increased by 0.1 volt (e.g., from 1.0 volt to 1.1 volt). Conversely, if the measured temperature is higher than temp_high (indicating that battery is warming up), (V2-V0)_selected is decreased by 0.1 volt (e.g., from 1.0 volt to 0.9 volt).

It will be appreciated that the various exemplary implementations of the two embodiments of the charger, as described above, may be combined in a number of ways by one of ordinary skill in the art without departing from the spirit of the invention. Although the description herein has shown, described and pointed out the fundamental novel features of the invention as applied to the various embodiments and implementations, it will be understood that various omissions, substitutions and changes in the form of the detail of the device and method illustrated may be made by those skilled in the art without departing from the spirit of the invention. Consequently, the scope of the invention should not be limited to the foregoing description, but should be defined by the appending claims.

What is claimed is:

1. A battery charging system comprising:
   a power supply that provides cyclic charging pulses to terminals of a battery, wherein application of the charging pulses results in a voltage at the terminals that includes a first voltage before the application of each pulse and a second voltage during the application of each pulse;

a battery monitoring circuit that monitors the first voltage and the second voltage of the charging pulses at the terminals; and a control module that adjusts the configuration of the charging pulses so as to maintain the first voltage and the second voltage in selected ranges with respect to desired values of the first and second voltages.

2. The battery charging system of claim 1, wherein the charging pulse is a positive pulse.

3. The battery charging system of claim 2, wherein the charging pulse comprises a square shaped current pulse having a first amplitude and a first width and wherein the charging cycle has a first period.

4. The battery charging system of claim 3, wherein the first amplitude has a range of approximately 0 to 20 Coulombs/second.

5. The battery charging system of claim 3, wherein the first width has a range of approximately 50 to 1000 milliseconds.

6. The battery charging system of claim 3, wherein the first period has a range of approximately 100 to 2000 milliseconds.

7. The battery charging system of claim 3, wherein a voltage representation of the charging pulse depends on the current associated with the charging pulse and resistance of the battery.

8. The battery charging system of claim 7, wherein the first voltage is a quiescent voltage of the battery at the terminals and the second voltage is the maximum voltage at the terminal during a given charging pulse, such that a charging voltage is defined as the difference between the maximum voltage and the quiescent voltage and wherein the charging voltage is indicative of the battery's ability to absorb charge.

9. The battery charging system of claim 8, wherein the control module maintains the charging voltage at a selected voltage level by adjusting the current associated with the charging pulses.

10. The battery charging system of claim 9, wherein the selected voltage level is approximately 1 volt.

11. The battery charging system of claim 9, wherein maintaining the charging voltage at the selected voltage level comprises maintaining the existing value of the current if the monitored charging voltage is approximately equal to the selected voltage level.

12. The battery charging system of claim 9, wherein maintaining the charging voltage at the selected voltage level comprises increasing the first amplitude of the current pulse by a selected amount if the monitored charging voltage is less than the selected voltage level.

13. The battery charging system of claim 12, wherein the selected amount of current pulse increase is approximately 0.05 Coulomb/second.

14. The battery charging system of claim 9, wherein maintaining the charging voltage at the selected voltage level comprises decreasing the first amplitude of the current pulse by a selected amount if the monitored charging voltage is greater than the selected voltage level.

15. The battery charging system of claim 14, wherein the selected amount of current pulse decrease is approximately 0.05 Coulomb/second.

16. The battery charging system of claim 3, wherein the control module maintains the quiescent voltage at the selected quiescent voltage range by adjusting the current associated with the charging pulses wherein the quiescent voltage provides some indication of charge state of the battery.

17. The battery charging system of claim 16, wherein the battery is a 12 volt sealed lead acid battery.

18. The battery charging system of claim 17, wherein the desired quiescent voltage level is approximately 13.5 volts.

19. The battery charging system of claim 16, wherein maintaining the quiescent voltage at the desired quiescent voltage level comprises maintaining the existing configuration of the current component if the monitored quiescent voltage is approximately equal to the desired quiescent voltage level.

20. The battery charging system of claim 16, wherein maintaining the quiescent voltage at the desired quiescent voltage level comprises increasing the first width of the current pulse by a selected amount if the monitored quiescent voltage is less than the selected quiescent voltage level.

21. The battery charging system of claim 20, wherein the selected amount of current pulse width increase is approximately 10 milliseconds.

22. The battery charging system of claim 16, wherein maintaining the quiescent voltage at the selected quiescent voltage level comprises decreasing the first width of the current pulse by a selected amount if the monitored quiescent voltage is greater than the selected quiescent voltage level.

23. The battery charging system of claim 22, wherein the selected amount of current pulse width decrease is approximately 10 milliseconds.

24. The battery charging system of claim 1, wherein the charging pulse comprises a positive square charging current pulse followed by a negative square discharging pulse having a discharging pulse amplitude and a discharging pulse width wherein the discharging pulse aids the battery in charge absorption.

25. The battery charging system of claim 24, wherein the discharging pulse amplitude has a range of approximately 20 to 200 Coulombs/second.

26. The battery charging system of claim 24, wherein the discharging pulse width has a range of approximately 1 to 20 milliseconds.

27. The battery charging system of claim 24, wherein the battery monitoring circuit further monitors the first voltage and a voltage immediately following the discharging pulse wherein a post-discharge voltage is defined as the difference between the voltage immediately following the discharging pulse and the first voltage and wherein the post-discharge voltage is indicative of the effectiveness of the discharge process.

28. The battery charging system of claim 27, wherein the control module maintains the post-discharge voltage at a selected post-discharge voltage level by adjusting the configuration of the current component of the charging pulses.

29. The battery charging system of claim 28, wherein the selected post-discharge voltage level is approximately 0.2 volt.

30. The battery charging system of claim 28, wherein maintaining the post-discharge voltage at the selected post-discharge voltage level comprises maintaining the existing configuration of the discharging pulse if the monitored post-discharge voltage is approximately equal to the selected post-discharge voltage level.

31. The battery charging system of claim 28, wherein maintaining the post-discharge voltage at the selected post-discharge voltage level comprises decreasing the discharging pulse amplitude by a selected amount if the monitored post-discharge voltage is less than the selected post-discharge voltage level.

32. The battery charging system of claim 31, wherein the selected amount of discharging pulse amplitude decrease is approximately 0.05 Coulomb/second.

33. The battery charging system of claim 28, wherein maintaining the post-discharge voltage at the selected post-discharge voltage level comprises increasing the discharging pulse amplitude by a selected amount if the monitored post-discharge voltage is greater than the selected post-discharge voltage level.

34. The battery charging system of claim 33, wherein the selected amount of discharging pulse amplitude increase is approximately 0.05 Coulomb/second.

35. The battery charging system of claim 1, wherein the control module further monitors a duty cycle of the pulse charging cycle to determine state of charge of the battery wherein the duty cycle comprises a ratio of charging pulse width to the charging cycle period.

36. The battery charging system of claim 35, wherein the duty cycle is monitored while maintaining the first voltage at the desired level.

37. A method of pulse charging a battery, the method comprising:

applying cycles of charging current pulses to the battery;

monitoring a first voltage and a second voltage of the battery in response to the charging current pulses, wherein the first voltage is the voltage of the battery before the application of each charging current pulse and the second voltage is the voltage of the battery during the application of each charging current pulse; and adjusting the configuration of the current pulse so as to maintain the first voltage and the second voltage in selected ranges with respect to their respective desired values.

38. The method of claim 37, wherein applying cycles of charging current pulse comprises applying cycles of positive square current pulse having a first amplitude and a first width and wherein the charging cycle has a first period.

39. The method of claim 38, wherein the first amplitude has a range of approximately 0 to 20 Coulombs/second.

40. The method of claim 38, wherein the first width has a range of approximately 50 to 1000 milliseconds.

41. The method of claim 38, wherein the first period has a range of approximately 100 to 2000 milliseconds.

42. The method of claim 37, wherein the first voltage is a quiescent voltage of the battery and the second voltage is the maximum voltage of the battery during a given charging pulse, such that a charging voltage defined as the difference between the maximum voltage and the quiescent voltage is monitored.

43. The method of claim 42, wherein maintaining the voltage comprises maintaining the charging voltage at a selected voltage level.

44. The method of claim 43, wherein the selected voltage level is approximately 1 volt.

45. The method of claim 42, wherein maintaining the voltage comprises maintaining the quiescent voltage at the desired quiescent voltage level.

46. The method of claim 45, wherein the desired quiescent voltage level is approximately 13.5 volts for a 12 volt battery.

47. The method of claim 37, wherein adjusting the configuration of the current pulse comprises increasing the first amplitude of the current pulse if the monitored charging voltage is less than the selected voltage level.

48. The method of claim 47, wherein the first amplitude is increased by approximately 0.05 Coulomb/second.

49. The method of claim 37, wherein adjusting the configuration of the current pulse comprises decreasing the first amplitude of the current pulse if the monitored charging voltage is greater than the selected voltage level.

50. The method of claim 49, wherein the first amplitude is decreased by approximately 0.05 Coulomb/second.

51. The method of claim 37, wherein adjusting the configuration of the current pulse comprises increasing the first width of the current pulse if the monitored first voltage is less than the desired first voltage level.

52. The method of claim 51, wherein the first width is increased by approximately 10 milliseconds.

53. The method of claim 37, wherein adjusting the configuration of the current pulse comprises decreasing the first width of the current pulse if the monitored first voltage is greater than the desired first voltage level.

54. The method of claim 53, wherein the first width is decreased by approximately 10 milliseconds.

55. The method of claim 37, wherein applying cycles of charging current pulse comprises applying cycles of a positive square charging pulse followed by a negative square discharging pulse wherein the discharging pulse has a discharging pulse amplitude and a discharging pulse width.

56. The method of claim 55, wherein the discharging pulse amplitude has a range of approximately 20 to 200 Coulombs/second.

57. The method of claim 55, wherein the discharging pulse width has a range of approximately 1 to 20 milliseconds.

58. The method of claim 55, wherein monitoring voltage of the battery comprises monitoring the first voltage and a voltage immediately following the discharging pulse wherein a post-discharge voltage is defined as the difference between the voltage immediately following the discharging pulse and the first voltage.

59. The method of claim 58, wherein maintaining the voltage comprises maintaining the post-discharge voltage at a selected post-discharge voltage level.

60. The method of claim 59, wherein the selected post-discharge voltage level is approximately 0.2 volt.

61. The method of claim 55, wherein adjusting the configuration of the current pulse comprises decreasing the discharging pulse amplitude if the monitored post-discharge voltage is less than the selected post-discharge voltage level.

62. The method of claim 61, wherein the discharging pulse amplitude is decreased by approximately 0.05 Coulomb/second.

63. The method of claim 55, wherein adjusting the configuration of the current pulse comprises increasing the discharging pulse amplitude if the monitored post-discharge voltage is greater than the selected post-discharge voltage level.

64. The method of claim 63, wherein the discharging pulse amplitude is increased by approximately 0.05 Coulomb/second.

65. The method of claim 37, wherein adjusting the configuration of the current pulse results in change in duty cycle of the charging pulse wherein the duty cycle comprises a ratio between the width of the charging pulse to the period of the cycle.

66. The method of claim 65, wherein the duty cycle is monitored wherein the duty cycle is a good indicator of state of charge for different types of batteries and wherein the duty cycle is generally independent of the type of battery.

* * * * *